(12) United States Patent
Breneman (10) Patent No.: US 11,207,695 B2
(45) Date of Patent: Dec. 28, 2021

(54) HERB GRINDER AND BLADES FOR HERB GRINDER

(71) Applicant: Superior Precision Engineering LLC, Chandler, AZ (US)

(72) Inventor: Brandon Breneman, Chandler, AZ (US)

(73) Assignee: Superior Precision Engineering LLC, Chandler, AZ (US)

( * ) Notice: Subject to any disclaimer, the term of this patent is extended or adjusted under 35 U.S.C. 154(b) by 179 days.

(21) Appl. No.: 16/544,650

(22) Filed: Aug. 19, 2019

(65) Prior Publication Data

US 2020/0061629 A1 Feb. 27, 2020

Related U.S. Application Data

(60) Provisional application No. 62/722,019, filed on Aug. 23, 2018.

(51) Int. Cl.
*B02C 18/08* (2006.01)
*A47J 42/34* (2006.01)
*B02C 18/18* (2006.01)

(52) U.S. Cl.
CPC ............... *B02C 18/08* (2013.01); *A47J 42/34* (2013.01)

(58) Field of Classification Search
CPC .. A47J 42/12; A47J 42/14; A47J 42/32; A47J 42/34; A47J 42/38; B02C 18/08; B02C 18/18
See application file for complete search history.

(56) References Cited

U.S. PATENT DOCUMENTS

| | | | | |
|---|---|---|---|---|
| 7,367,519 | B2 * | 5/2008 | de Groote | A47J 19/04 241/169.1 |
| 9,521,929 | B1 * | 12/2016 | Raphael | B02C 18/186 |
| 9,757,733 | B1 * | 9/2017 | Dukat | A47J 42/40 |
| 2008/0191073 | A1 * | 8/2008 | Bao | B02C 18/24 241/101.2 |
| 2012/0168544 | A1 * | 7/2012 | Chaoui | A47J 42/24 241/68 |
| 2013/0214068 | A1 * | 8/2013 | Camitta | B02C 18/24 241/25 |
| 2014/0217213 | A1 * | 8/2014 | Edwards | A47J 42/40 241/69 |
| 2014/0353412 | A1 * | 12/2014 | Grumbacher | A24C 5/40 241/70 |
| 2016/0100715 | A1 * | 4/2016 | Staiano | A47J 42/34 241/79 |
| 2016/0270597 | A1 * | 9/2016 | Walczak | A47J 42/26 |
| 2017/0135524 | A1 * | 5/2017 | Moneta | A47J 42/24 |
| 2017/0164786 | A1 * | 6/2017 | Camitta | A24B 7/06 |
| 2017/0202396 | A1 * | 7/2017 | Gumbel | A47J 42/12 |
| 2017/0245541 | A1 * | 8/2017 | Pagan | A47J 42/34 |
| 2017/0251878 | A1 * | 9/2017 | Dukat | B02C 23/10 |

(Continued)

*Primary Examiner* — Faye Francis
*Assistant Examiner* — Mohammed S. Alawadi
(74) *Attorney, Agent, or Firm* — Brian M. Kaufman; Robert D. Atkins; Patent Law Group: Atkins and Associates, P.C.

(57) ABSTRACT

A grinder has a bottom with a first row of first asymmetrical blades extending from the bottom. A top of the grinder has a second row of second asymmetrical blades extending from the top. The first asymmetrical blades and second asymmetrical blades are triangle shaped. A first side of each blade has one point, and a second side of each blade has two points.

18 Claims, 12 Drawing Sheets

(56) References Cited

U.S. PATENT DOCUMENTS

| | | | |
|---|---|---|---|
| 2018/0126386 A1* | 5/2018 | Witko | B02C 18/16 |
| 2018/0271327 A1* | 9/2018 | Haskins | A47J 42/14 |
| 2018/0271328 A1* | 9/2018 | Petrossian | A47J 42/24 |
| 2019/0110644 A1* | 4/2019 | Sanchez | A47J 43/25 |
| 2019/0269277 A1* | 9/2019 | Larose | A47J 42/34 |

* cited by examiner

HERB GRINDER AND BLADES FOR HERB GRINDER

CLAIM TO DOMESTIC PRIORITY

The present application claims the benefit of U.S. Provisional Application No. 62/722,019, filed Aug. 23, 2018, which application is incorporated herein by reference.

FIELD OF THE INVENTION

The present invention relates in general to herb grinders and, more particularly, to blades for use in herb grinders and herb grinders having the blades.

BACKGROUND OF THE INVENTION

Herb grinders are commonly used for breaking up organic material. The material is commonly herbs and spices used in the kitchen, e.g., oregano, cilantro, rosemary, or marjoram. Grinding dry herbs is beneficial to release flavorful oils and allow for more surface area to be exposed in the dish being cooked. Herb grinders are also used in a variety of other situations where a person wants to separate relatively large chunks of organic material into smaller pieces.

Herb grinders are commonly designed with two pieces that form a grinding cavity. The two pieces have teeth or pegs aligned in such a way that, when the halves are turned relative to each other, the teeth move between each other to shred the material inside. However, herb grinders in the past have simple blade designs that are unable to adjust to a finer or coarser grind. Herb grinders typically only grind to one particle size, which limits the potential uses of the grinder. Therefore, a need exists for herb grinder blades and herb grinders having more versatile usage.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention.

Figure 1A:
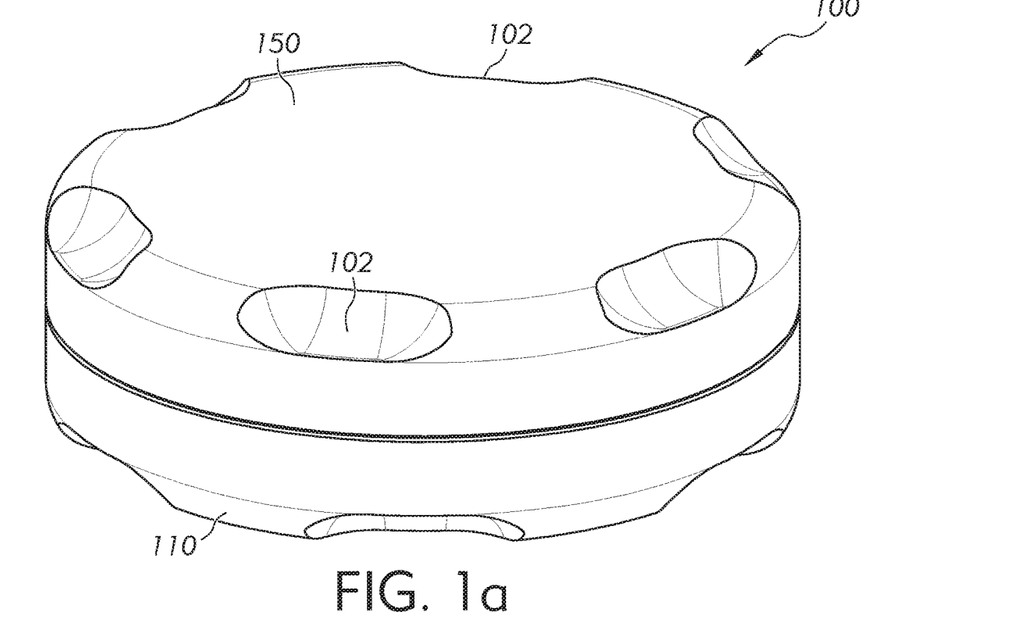
FIGS. 1a-1g illustrate an herb grinder having asymmetrical blades.

FIG. 1a illustrates a grinder 100 comprising a bottom 110 and top 150. The top 150 and bottom 110 are removable from each other, and material to be ground is placed in a chamber formed by the two sides. The material can be anything that consumers typically desire to grind. Common materials are tea leaves, tobacco leaves, wheat or flour, dried ginger, garlic, onion, other spices, or any other suitable material for eating, drinking, smoking, or for other purposes.

With the material inserted into the grinder, the bottom 110 and top 150 are rotated relative to each other to grind the material into smaller pieces. Indentations 102 are formed around the edges of grinder 100 to provide grip for a user's fingers to apply a force to the two halves along their respective circumferences. Other gripping mechanisms are provided in other embodiments, e.g., knurling or grip tape around the outside of grinder 100. In one embodiment, grinder 100 includes a mechanism for attaching handles to the grinder to reduce the difficulty in applying force. A motor can be attached to automatically turn the sides of grinder 100 relative to each other.

Figure 1B:
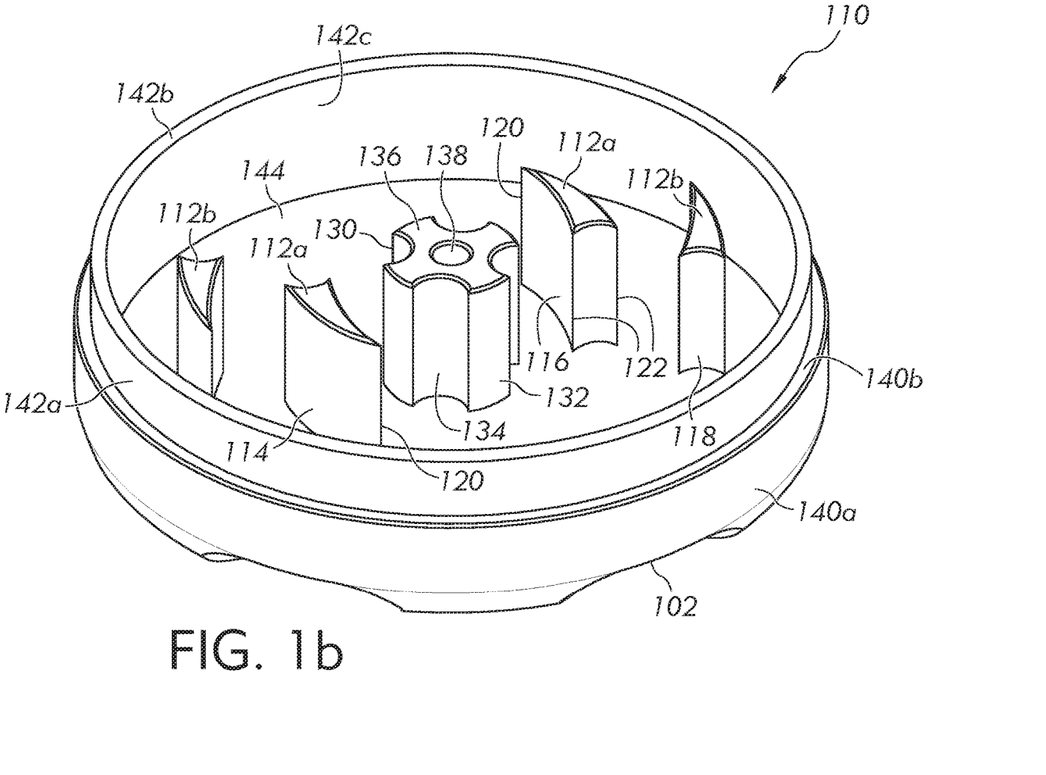
Figure 1C:
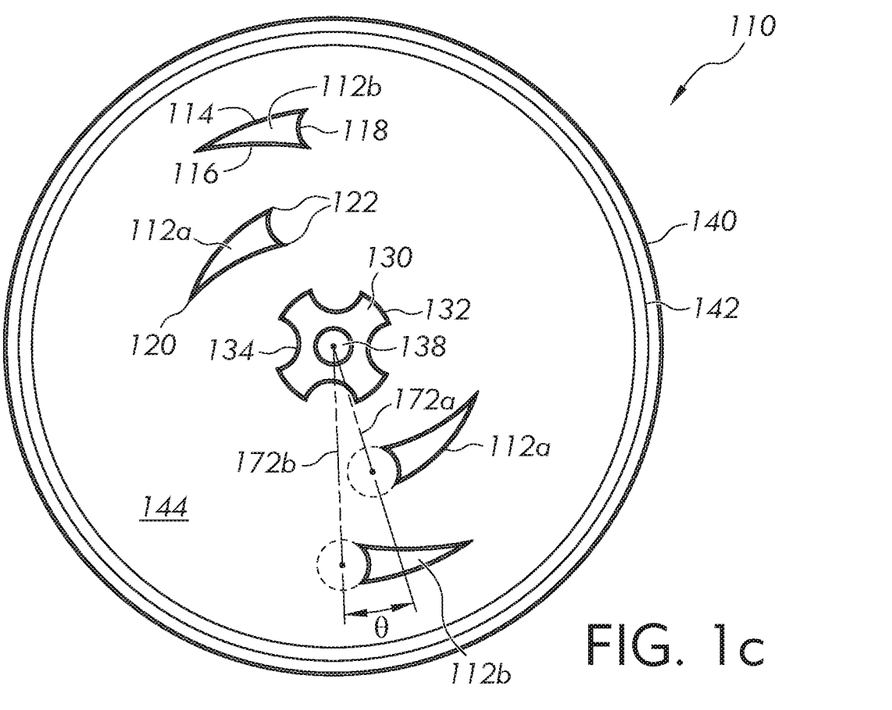

FIG. 1b illustrates a perspective view of bottom 110 with top 150 removed, and FIG. 1c illustrates a plan view. Bottom 110 includes teeth, claws, or blades 112 to perform the grinding operation. Blades 112 are distributed in two rows extending from the middle of bottom 110 outward. Each row of blades 112 includes a blade 112a closer to the middle and a blade 112b farther from the middle. The rows of blades are substantially identical to each other but disposed on opposite sides of bottom 110. In FIG. 1b, one row of blades extends to the left of the figure, and another row of blades extends to the right of the figure. In FIG. 1c, the rows extend toward the top-left and bottom-right of the figure, respectively. In larger embodiments, more than two rows of blades are optionally used.

Each blade 112 includes an outer surface 114, an inner surface 116, and a back surface 118. Each of the three surfaces 114-118 lies on an arc of a circle. Outer surface 114 is convex and surfaces 116 and 118 are concave. The three arcs of surfaces 114, 116, and 118 each meet at their respective ends to form a curved triangle shape in plan view. The curvature of outer surface 114 follows the arc of a circle concentric with grinder 100. Outer surface 114 of each blade 112a is formed at a first common radius from the center of bottom 110. Each blade 112b also has an outer surface 114 formed along the arc of a common circle. Back surface 118 of each blade 112 is a portion of a circle with a circumference tangent to or overlapping the circles of both inner surface 116 and outer surface 114. Inner surface 116 of each blade 112 is a curve or arc that connects outer surface 114 and back surface 118.

Each blade 112 includes a front point 120 where inner surface 116 meets outer surface 114, and two rear points 122 where back surface 118 meets the inner and outer surfaces. Blades 112 are asymmetrical across a radial line of grinder 100. One side of a radial line through a blade 112 has one point 120 for grinding, while the other side has two points 122 for grinding. For example, radial line 172a extends through the approximate center of blade 112b in FIG. 1c. Blade 112b includes one point 120 on the right side of radial line 172a, and two points 122 on the left side of radial line 172a.

A spindle 130 is formed at the center of bottom 110 between the rows of blades 112. Spindle 130 has an outer circular surface 132 and a plurality of concave circular cutouts 134. Cutouts 134 are arcs of circles in one embodiment. A top surface 136 of spindle 130 includes an opening 138 formed down into the spindle to accommodate a steel pin for magnetic attraction to top 150 in embodiments where bottom 110 is formed from aluminum or another non-ferrous material. When bottom 110 is formed from stainless steel or another ferrous material a steel pin, and therefore opening 138 is not required for magnetic attraction to top 150. The top edges of blades 112 and spindle 130 are chamfered or beveled to reduce the sharpness of the edge for safety of the user and to reduce the likelihood of damage to the edges during use. The edge formed by surface 140*a* and lip 140*b* is also chamfered. The top of ridge 142 is chamfered or rounded, which can be seen more clearly in the cross-section of FIG. 1*f*.

Bottom 110 includes an outer surface 140*a* and a lip 140*b* formed around the bottom. A ridge 142 includes an outer surface 142*a*, a top surface 142*b*, and an inner surface 142*c*. Outer surface 140*a* of bottom 110, surfaces 142*a* and 142*c* of ridge 142, outer surfaces 114 of blades 112, outer surface 132 of spindle 130, and opening 138 of spindle 130 all form or lie on circles that are concentric with each other.

Figure 1D:
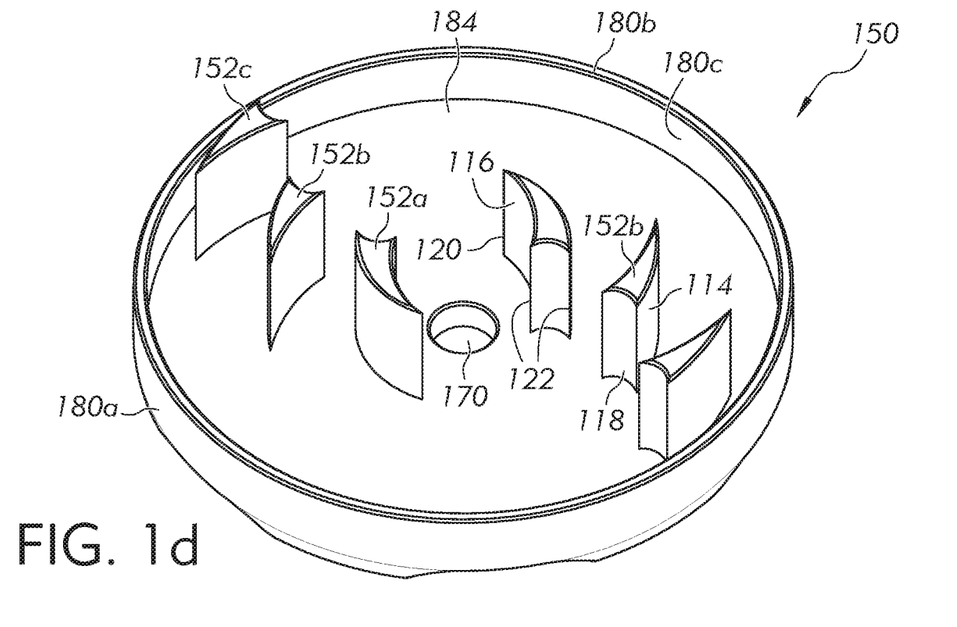
Figure 1E:
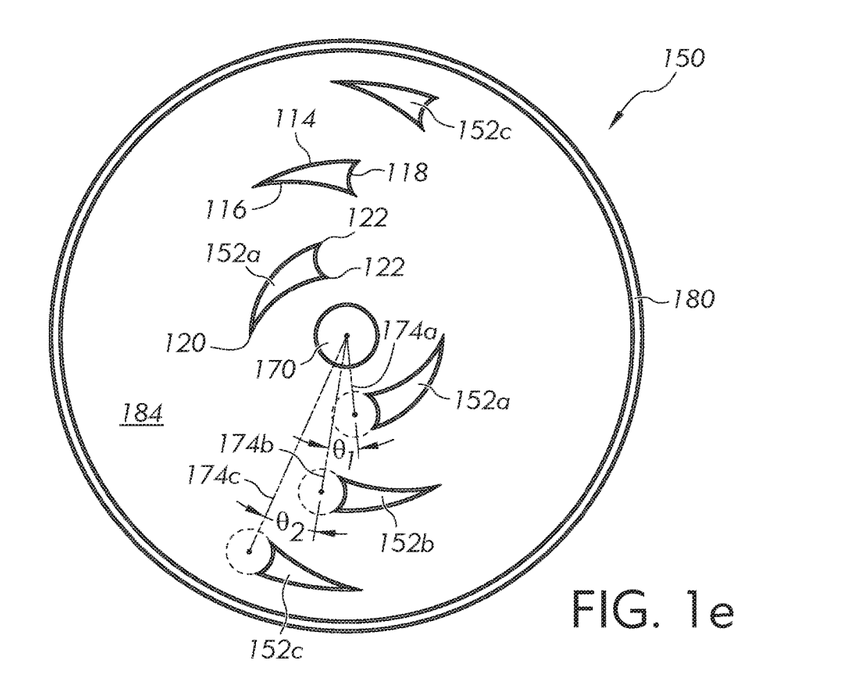

FIG. 1*d* shows a perspective view of top 150, and FIG. 1*e* shows a plan view. Top 150 includes blades 152, which are similar to blades 112 of bottom 110. Blades 152 are formed in two rows extending from the center of top 150 opposite each other. Each row includes three blades 152*a*, 152*b*, and 152*c* disposed at various distances from the center. The outer surfaces 114 of blades 152*a*, 152*b*, and 152*c* are formed on circles of varying diameters. Blades 152 are formed using the same design rules as blades 112, with the diameter of the circles that outer surfaces 114 are formed on being different. The circles for outer surfaces 114 of blades 112 and 152 are alternated so that the blades are able to move between each other as discussed below and shown in FIG. 1*g*.

An opening or cavity 170 formed at the center of top 150 accommodates a magnet to attach to the ferrous pin disposed in spindle 130 of bottom 110. A lip 180 around the outside of top 150 includes an outer surface 180*a*, a top surface 180*b*, and an inner surface 180*c*. When top 150 is disposed on bottom 110, lip 180 is placed around ridge 142 to enclose the chamber with blades 112 and 152 between the top and bottom.

Figure 1F:
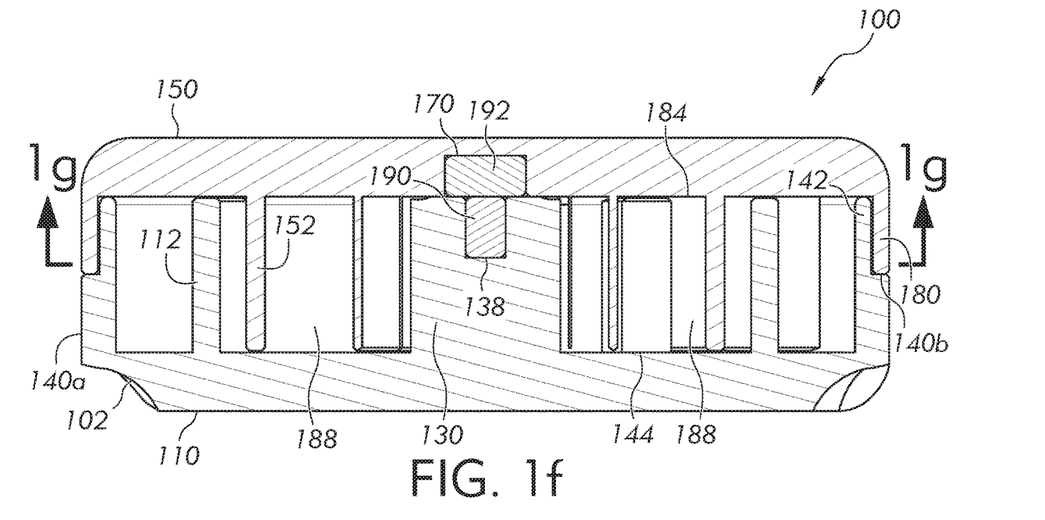

FIG. 1*f* shows a cross-section of grinder 100 with top 150 and bottom 110 put together to enclose cavity 188. With the material to be grinded inserted into cavity 188, top 150 and bottom 110 are put together with lip 180 of the top around ridge 142 of the bottom. The halves are pushed together to enclose grind cavity 188. The heights of the sides are selected so that the top of ridge 142 contacts bottom surface 184 of top 150 and the bottom of lip 180 touches lip 140*b* of bottom 110. The top surface of spindle 130 also contacts bottom surface 184 of top 150.

A metal pin 190 is disposed in cavity 138, and a magnet 192 is disposed in cavity 170. Alternatively, the magnet could be disposed in bottom 110 and the metal slug in top 150, or magnets could be disposed in both top and bottom. In one embodiment, metal pin 190 and magnet 192 are press fit into their respective cavities. In other embodiments, an adhesive, a fastener, or another suitable means is used to fix the magnetic parts into the cavities. With top 150 and bottom 110 put together, magnetic force between pin 190 and magnet 192 helps keep grinder 100 closed around cavity 188 during use.

Blades 112 and 152 are formed slightly shorter than the height of cavity 188 so that the blades do not rub against the opposing bottom surfaces 144 and 184. In one embodiment, a gap of 0.005 inches is disposed between the top surfaces of blades 112 and bottom surface 184, and also between the top surfaces of blades 152 and bottom surface 144, when grinder 100 is closed. The gap between the blades and bottom surfaces reduces rubbing for a smoother motion when rotating the halves relative to each other.

Figure 1G:
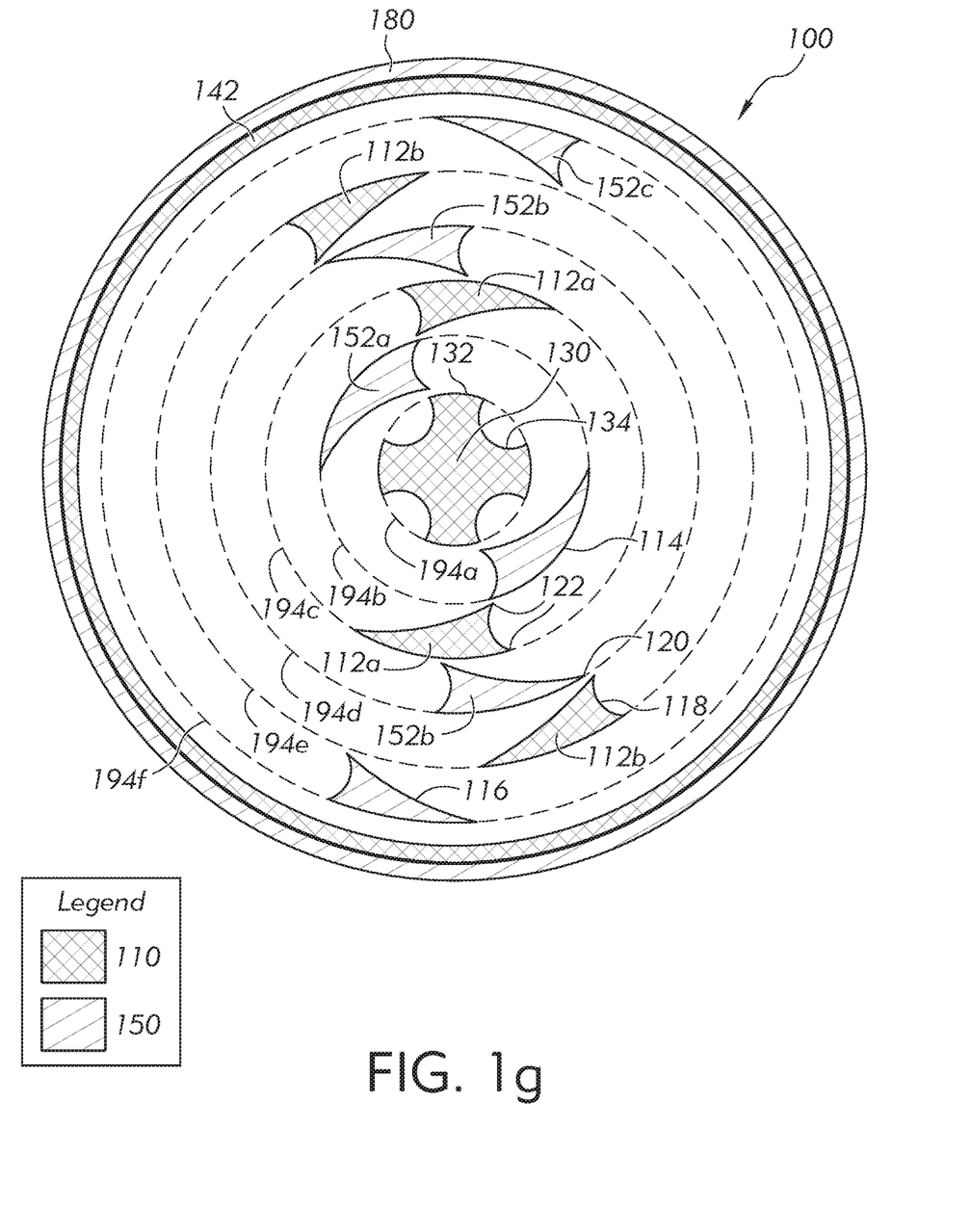

FIG. 1*g* shows a cross-section of grinder 100 in plan view with top 150 and bottom 110 put together. Bottom 110 is shaded with square hatch marks, and top 150 is shaded with lines. The relative positions of blades 112 and 152 is illustrated. A plurality of concentric circles 194 is drawn in dotted lines to illustrate the circles that outer surfaces 114 and 132 are formed on.

Outer surface 132 of spindle 130 is formed on circle 194*a* and remains on the circle as bottom 110 and top 150 are rotated relative to each other. Outer surfaces 114 of blades 152*a* are formed on circle 194*b* and remain on the circle during use. Outer surfaces 114 of blades 112*a* are formed on circle 194*c* and remain on the circle during use. Outer surfaces 114 of blades 152*b* are formed on circle 194*d* and remain on the circle during use. Outer surfaces 114 of blades 112*b* are formed on circle 194*e* and remain on the circle during use. Outer surfaces 114 of blades 152*c* are formed on circle 194*f* and remain on the circle during use.

Circles 194 are spaced apart from each other at intervals that are slightly wider than the width of a blade between rear points 122. The spacing of circles 194 allows blades 112 to travel between adjacent blades 152, and vice versa, when the halves are turned. In one embodiment, the distance between successive circles 194 is 0.16 inches, and blades 112 and 152 have a width between rear points 122 of 0.15 inches. Other suitable dimensions are used in other embodiments.

A gap of approximately 0.1 inches is left between the outermost blade 152*c* of top 150 and the inner wall 142*c* of bottom 110 to reduce binding of the grinder during use. In other embodiments, no gap or a 0.01-inch gap is left between outer surface 114 of blade 152*c* and ridge 142. However, the larger 0.1-inch gap reduces binding that may occur when fine particles become lodged between blade 152*c* and ridge 142 without the gap. A gap of approximately 0.005 to 0.01 inches is provided between the outer surface 142*a* of bottom 110 and the inner surface 180*c* of top 150 to reduce friction when the halves are rotated.

The blades 112 or 152 within a row are offset circumferentially. That is, each blade is shifted along the direction of its respective circle 194 relative to the adjacent blades. The lines 172*a* and 172*b* in FIG. 1*c* illustrate the circumferential offset of blades 112. Each blade 112 has a rear surface 118 that is an arc of a circle. FIG. 1*c* shows the circles as dotted lines. The centers of the circles for rear surfaces 118 are each on a respective line 172. Blade 112*a* has its rear points 122 placed relative to radial line 172*a*, and blade 112*b* has its points 122 placed relative to radial line 172*b*. The angle theta ($\theta$) illustrates the amount of offset. In FIG. 1*e*, blades 152*a*-152*c* have points 122 placed relative to lines 174*a*-174*c*, respectively. An offset $\theta_1$ exists between blades 152*a* and 152*b*, and an offset $\theta_2$ exists between blades 152*b* and 152*c*.

In the illustrated embodiment, $\theta$, $\theta_1$, and $\theta_2$ are all fifteen degrees of a 360-degree circle, and the circumferential length of outer surface 114 of each blade 112 and 152 is the same. In other embodiments, the offsets between different blades can be different sizes and any suitable offset is used, including zero degrees if desired. The offset can be based on point 120 or the center of each blade instead of points 122. In other embodiments, the length of the blades increases toward the outside of grinder 100 so that each point 120 and 122 has the same offset.

The purpose of the circumferential offset between blades is to cause the blades to grind material sequentially. If grinding with points 120 leading, the innermost blades grind first, followed by the next further our blades, and finally the outermost blades grind the material. When points 122 are used, the outermost blade grinds first and innermost blade last. Without an offset between subsequent blades, each blade would have to push through the material at practically the same time, increasing the effort required to grind.

With top 150 and bottom 110 placed together, the halves are rotated relative to each other to perform a grind. Blades 112 and 152 have an asymmetrical shape with respect to a reflection across a radial line of grinder 100. If top 150 is rotated counterclockwise relative to bottom 110 in the view of FIG. 1g, blades 112 and 152 pass each other leading with a single point 120 per blade. On the other hand, if top 150 is rotated clockwise the blades pass each other leading with back surface 118 and the double points 122.

Figure 2A:
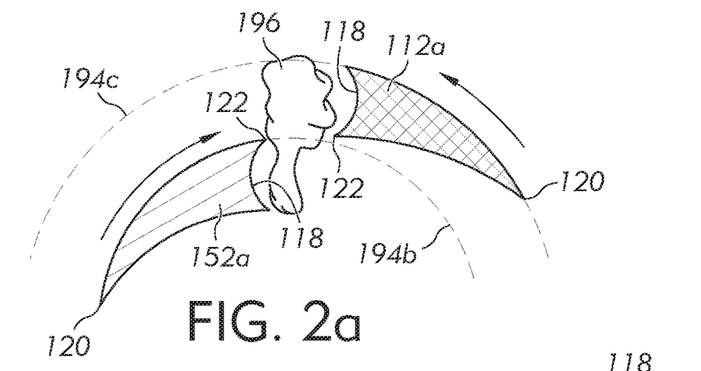
FIGS. 2a-2d illustrate the herb grinder operating in a finer grinding mode and a coarser grinding mode.
Figures 2B, 2C:
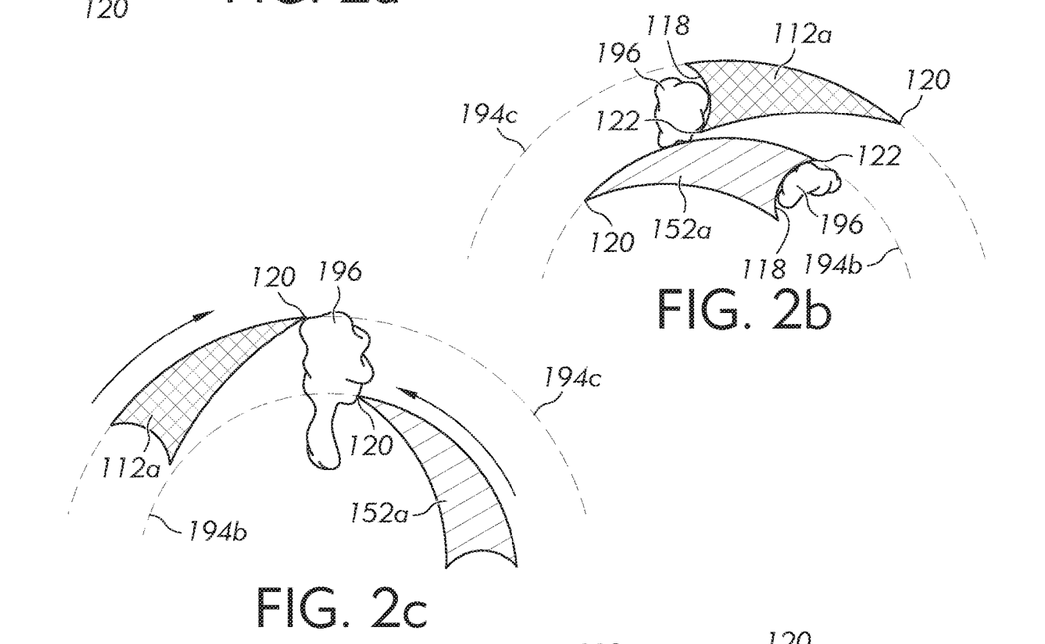

FIGS. 2a-2d illustrate grinding of material 196 using the two different grinding directions. FIGS. 2a and 2b illustrate a finer grind using points 122. In FIG. 2a, material 196 is disposed in cavity 188. Arrows are drawn to illustrate the directions that the halves move relative to each other. Blade 152a is being moved to the right, and blade 112a is being moved to the left, both with their respective back surfaces 118 and dual points 122 leading.

As blades 112a and 152a move past each other, the adjacent points 122 and concave surfaces 118 grab and rip apart material 196 as shown in FIG. 2b. The upper point 122 of blade 152a, which is disposed on circle 194b, passes within about 0.01 inches of the lower point 122 of blade 112a. Using points 122 for grinding ensures a fine shred by applying forces to material 196 in opposite directions in very close proximity. Very little material will be able to escape shredding unless the particles are under 0.01 inches wide. The innermost point 122 of blade 152a moves in similarly close proximity of spindle 130. Concave back surfaces 118 cup material 196 and help keep a portion of the material with each blade. Concave surfaces 134 of spindle 130 also help gather and shred the material to be ground as blades 152a move past.

Figure 2D:
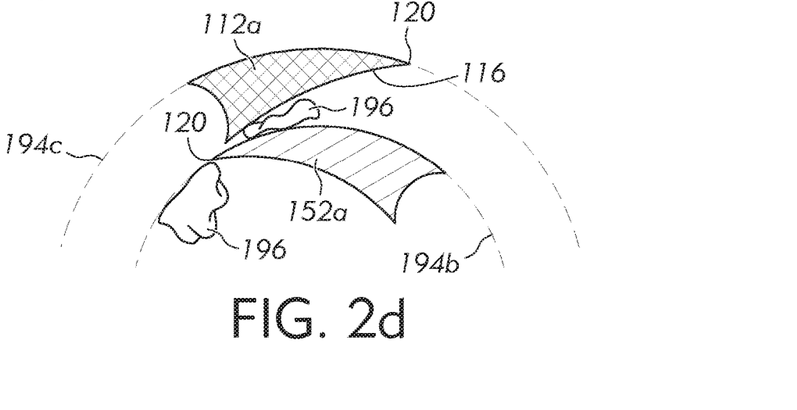

FIGS. 2c and 2d show rotating the blades in the opposite, with points 120 leading. Blade 112a is moving to the right, and blade 152a is moving to the left. Points 120 dig into material 196 and pull pieces of the material in different directions. Whereas the distance between shredding points 122 in FIGS. 2a and 2b was only about 0.01 inches, the distance between shredding points 120 is the full distance from circle 194b to circle 194c, about 0.16 inches in the illustrated embodiment. The wider distance between points 120 means larger particles may escape being shredded, and thus a coarser grind is produced. Particles that were larger than the 0.01-inch gap between blades can be compressed between inner surface 116 of blade 112a and outer surface 114 of blade 152a to fit between the blades the without being shredded into smaller pieces.

If top 150 is rotated in one direction, the blades 112 and 152 grind with front points 120 leading. Opposing points 120 of blades 112 and 152 rip into the material to be ground as the blades move past each other. If top 150 is rotated in the opposite direction, blades 112 and 152 grind with back points 122 leading. There are twice as many points 122 on the back of blades 112 than there are points 120 on the front, and the gap between blades is smaller. Each back point 122 travels within about 0.01 inches of another back point 122 going the opposite direction, while the front points 120 are spaced out approximately 0.16 inches from each other as the blades move past each other. Therefore, turning top 150 to lead with front points 120 results in a coarser grind, and turning top 150 to lead with back points 122 results in a finer grind.

Figure 3A:
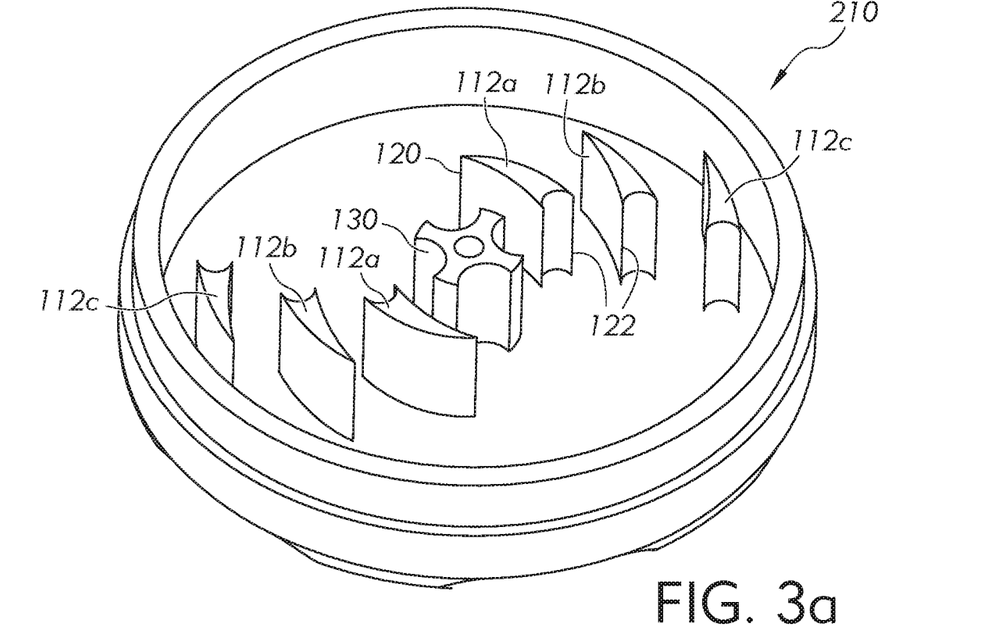
FIGS. 3a-3c illustrate an intermediate sized herb grinder.
Figure 3B:
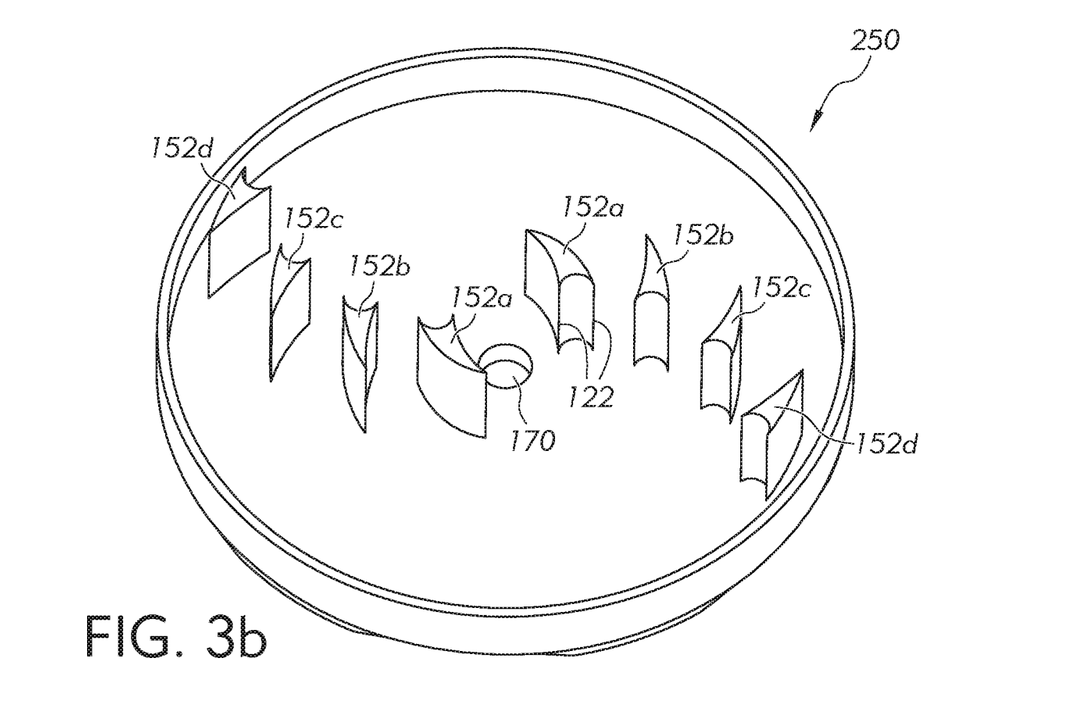
Figure 3C:
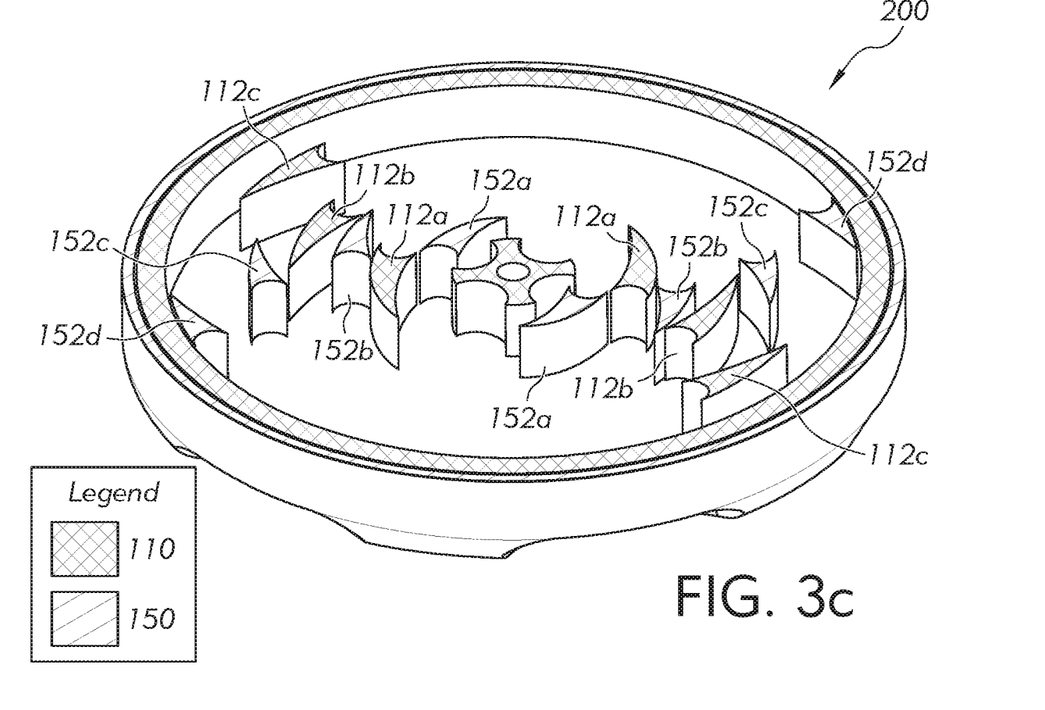
Figure 4A:
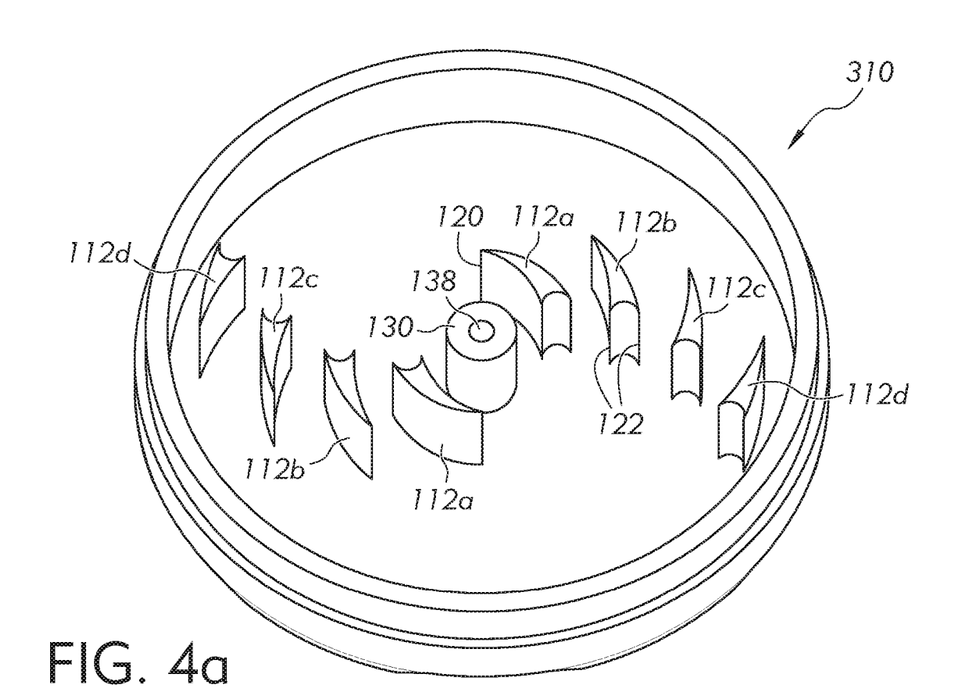
FIGS. 4a-4c illustrate a larger sized herb grinder.
Figure 4B:
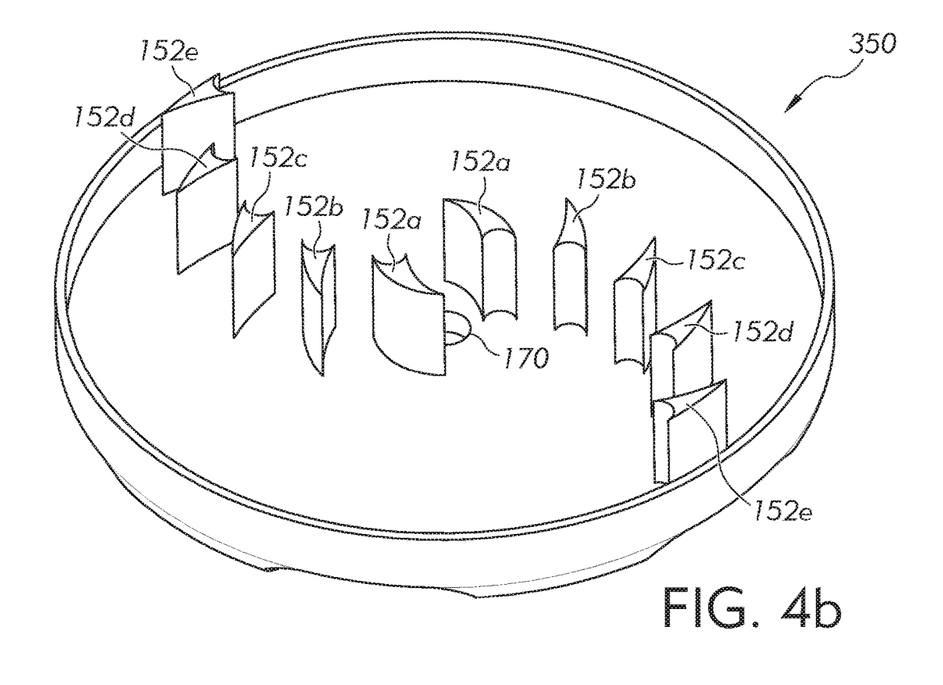
Figure 4C:
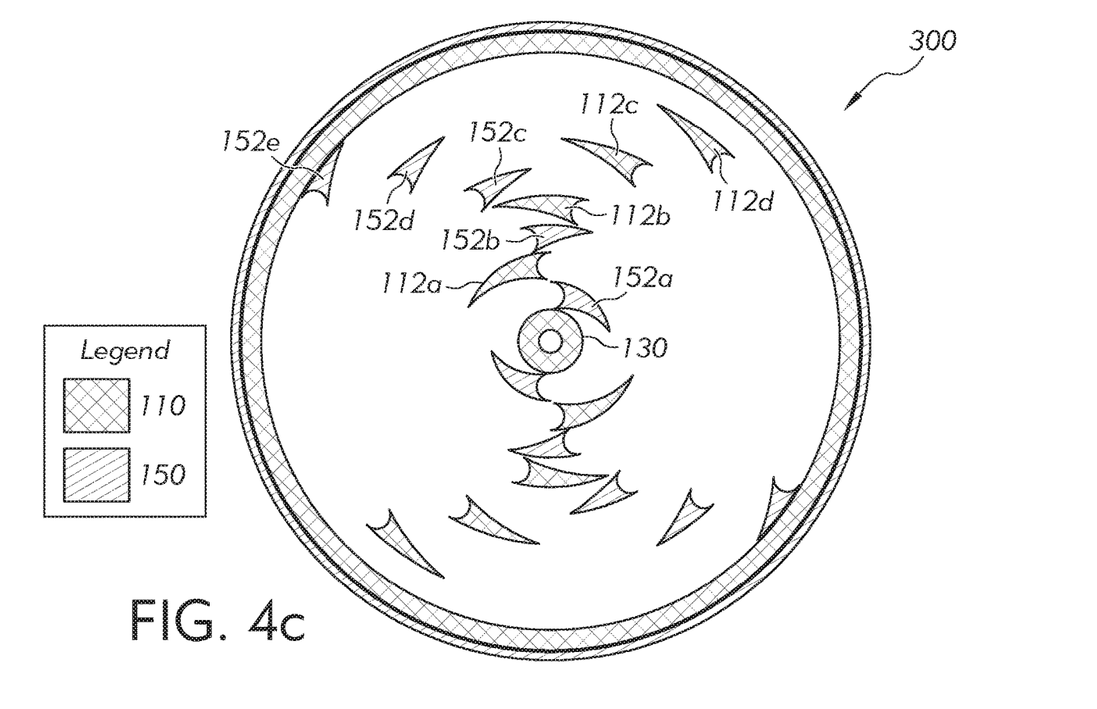

Grinder 100 in FIGS. 1a-1g has a diameter of approximately 2.5 inches. Similar grinders using similar design concepts for the blades can be formed of any size. The asymmetrical blades can be enlarged in any dimension to accommodate a larger chamber, or more blades can be used per row of the same or a different size. FIGS. 3a-3c illustrates an intermediate sized grinder 200 with an extra blade per side. FIGS. 4a-4c illustrate a large grinder 300 with two extra blades per side relative to grinder 100. The additional blades are used to grind material within the increased diameters of the grinders.

Grinder 200 has an intermediate diameter, e.g., approximately 3 inches. To accommodate for the additional size of the grinder, the number of blades is increased. The top and bottom are each given one extra blade per row relative to the smaller grinder 100. Alternatively, blades could be made wider for a larger device rather than increasing the number of blades. However, keeping a uniform spacing between adjacent points 120 (around 0.16 inches) and adjacent points 122 (around 0.01 inches) keeps relatively consistent grind settings between differently sized grinders.

FIG. 3a shows bottom 210 with three blades, 112a, 112b, and 112c, per row, whereas bottom 110 had two blades per row. FIG. 3b shows top 250 with four blades, 152a, 152b, 152c, and 152d per row of blades, whereas top 150 had three blades per row. Blades 112 and 152 of grinder 200 are formed with similar design rules as in grinder 100, with outer surfaces 114 formed on concentric circles having diameters configured to allow the blades to pass between each other.

FIG. 3c is a cross section illustrating how the blades 112 and 152 interact when grinder 200 is in use. As with grinder 100, turning top 150 clockwise in the view of FIG. 3c results in a coarser grind by leading with the end of the blades with only a single point 120, while turning counterclockwise results in a finer grind by leading with the end of the blades with double points 122. Additionally, as with grinder 100, the blades are staggered circumferentially so that the blades do not all hit the material being ground at one time.

FIGS. 4a-4c illustrate a large-sized grinder 300 with bottom 310 in FIG. 4a and top 350 in FIG. 4b. Grinder 300 includes an overall diameter of approximately 3.5 inches. To fill the larger space, bottom 310 includes four blades 112 per row and top 350 includes five blades 152 per row. Each blade 112 and 152 follows similar design rules as the other embodiments, with outer surfaces 114 formed on concentric circles with diameters configured to allow the blades to travel between each other. FIG. 3c is a cross-section showing how the top and bottom blades sit relative to each other during use.

Grinders 100, 200, and 300 are formed in any suitable manufacturing process. In one embodiment, blanks for the top and bottom of the grinder are cut from bar stock with a suitable diameter, e.g., 2.5-inch bar stock for grinder 100 with a final diameter of 2.48 inches. The bar stock is normally aluminum or stainless steel, but any suitable material is used in other embodiments. Aluminum is cheaper and normally used for general commercial applications. Stainless steel is suitable for medical grade use.

The blank is cut from the bar stock to the appropriate thickness for forming a top or bottom of a grinder. The blank is then turned on a lathe and bored or milled to form the blades and other structural features. In other embodiments, the grinders are 3D-printed or formed using any other suitable manufacturing process.

A grinder can be formed similar to the above embodiments in any suitable diameter and thickness. A taller grinder allows more material to be ground at once, as does a larger diameter grinder. The blades of a taller grinder are made taller to fill the vertical height of the grinding chamber. The diameter of the grinder could be reduced or increased indefinitely to grind the desired amount of material at once.

The grinder diameter could be 1-2 inches, 6-8 inches, 12-14 inches, 20-24 inches, 36 inches, or any other suitable diameter. While the illustrated embodiments have two rows of blades extending from the center, larger embodiments may have three, four, or even more rows of blades radiating from the center. In some larger embodiments, the number of rows is increased toward the outside of the grinder, while closer to the middle there may still only be two rows of blades. The smaller embodiments include two rows to leave sufficient room for the material to be grinded but could include more rows of blades as well.

In some embodiments, the grinder blades are removable by screwing the blades into the top or bottom, by using a bolt extending through the top or bottom that threads into the blades, by pressing the blades into openings of the top or bottom, or by any other suitable means. A detent, indentation, notch, or similar feature can be formed to keep the removable blades aligned properly. In some embodiments, the blade angles are adjustable to modify the properties of the ground material.

Figure 5A:
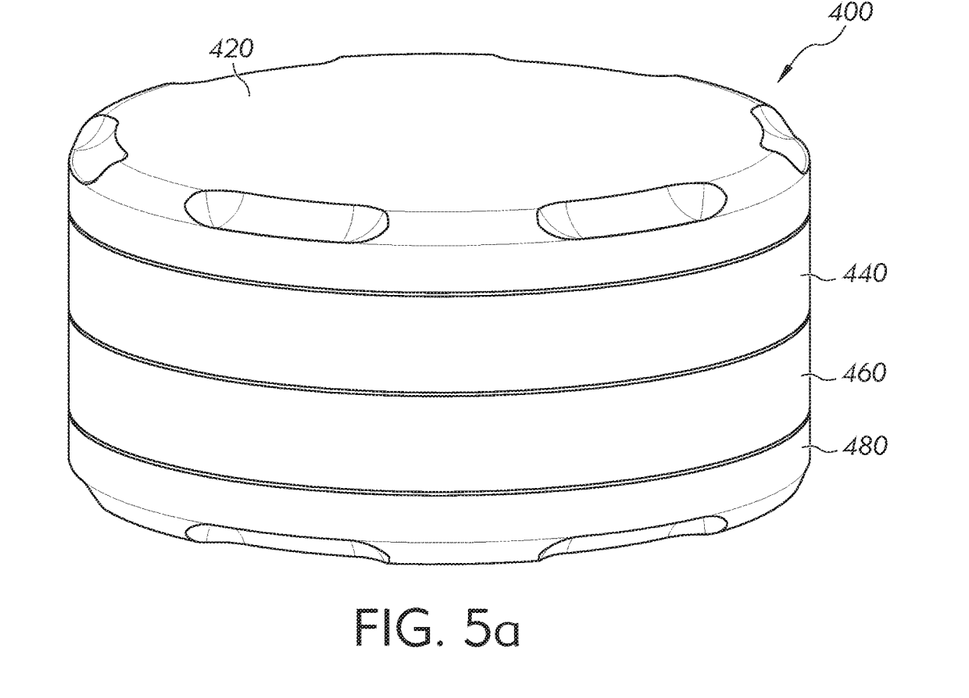
FIGS. 5a-5h illustrate a multi-compartment grinder with filtering to separate different sized particles into different compartments.
Figure 5B:
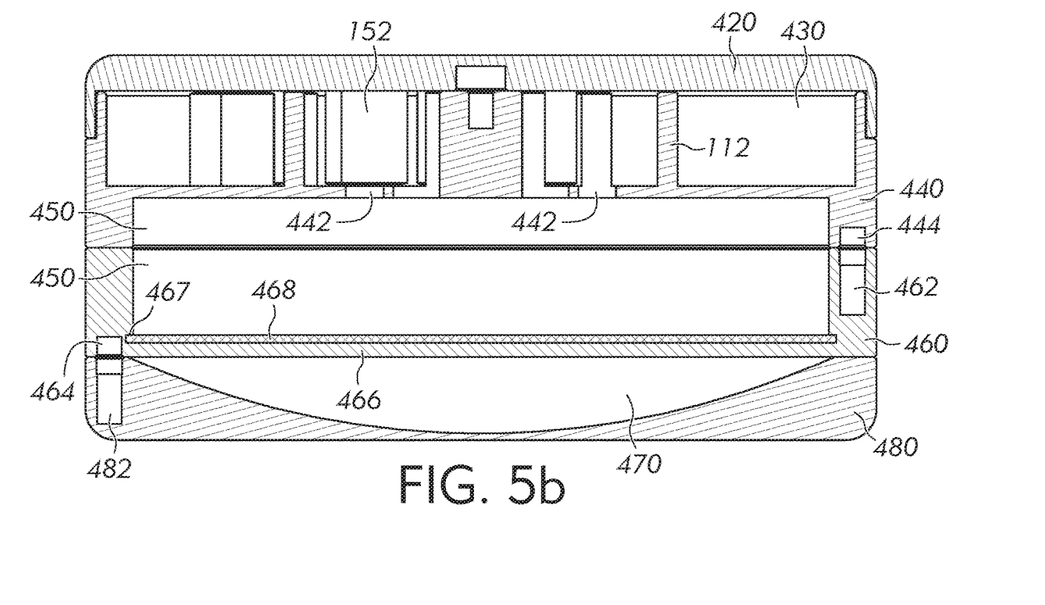

FIGS. 5a-5h illustrate an embodiment with additional chambers to process the ground material. FIG. 5a shows grinder 400 with four different parts of the grinder stacked, while FIG. 5b shows a cross-section of the stack. Grinder top 420 and grinder bottom 440 correlate to top 150 and bottom 110 above. Grinder top 420 includes blades 152 extending downward toward grinder bottom 440. Grinder bottom 440 includes blades 112 oriented upward toward grinder top 420. Grinder top 420 and grinder bottom 440 are turned relative to each other to grind a material inserted into grind chamber 430 as in the above embodiments. Blades 112 and 152 remain asymmetrical so that the turning direction changes the coarseness of grind.

Grinder bottom 440 includes openings or holes 442 formed in the bottom to allow ground material to fall into a grind catching chamber 450. When the ground material pieces get small enough, they fall through openings 442. A user of grinder 400 can feel when all the material has been ground and has all fallen into chamber 450 based on the resistance in turning the grinder. Filter holder 460 provides a bottom to catch the ground material. Cavities 444 in grinder bottom 440 hold metal pins, and cavities 462 in filter holder 460 hold magnets, or vice versa, to keep the filter holder attached to the grinder bottom during usage. The pins in cavities 444 extended into the top portion of cavities 462 to transfer rotational motion from filter holder 460 to grinder bottom 440 and keep the parts aligned. Grinder bottom 440 can be formed with extensions instead of cavities, and a separate pin is not needed to keep the parts aligned. As illustrated below, three of each cavities 444 and 462 are evenly distributed around the circumference of the grinder. Any number of pins and magnets could be used.

The bottom of filter holder 460 includes filter support 466 and a filter rim 467. Filter support 466 forms a cross to support filter 468. The edges of filter 468 sit within rim 467 to keep the filter in place. Filter 468 is a screen filter with openings smaller than openings 442 to filter out fine particles into fine particle chamber 470. Chamber bottom 480 provides a bottom to chamber 470 and catches the fine particles. Typically grinding of any material will produce fine dust-like particles that are undesirable for the final use of the material. Some plant-based materials include pollen or tiny hairs that have an undesirable flavor. Those tiny particles fall into chamber 470 and can be discarded or used separately. Cavities 464 and 482 include magnets and metal pins to keep chamber bottom 480 attached to filter holder 460 during use, which operate similarly to the pins and magnets in cavities 444 and 462.

Figure 5C:
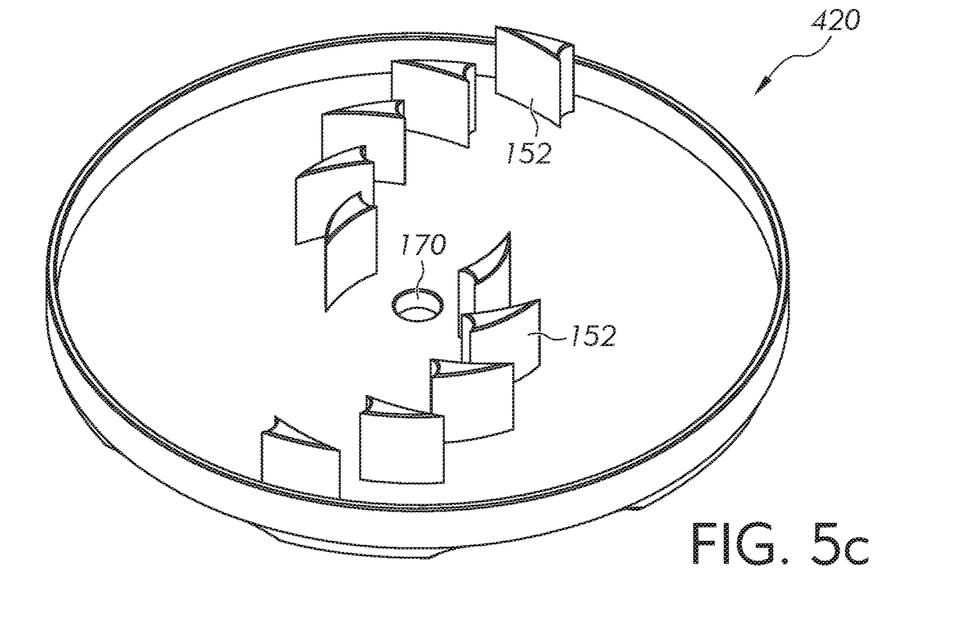
Figure 5D:
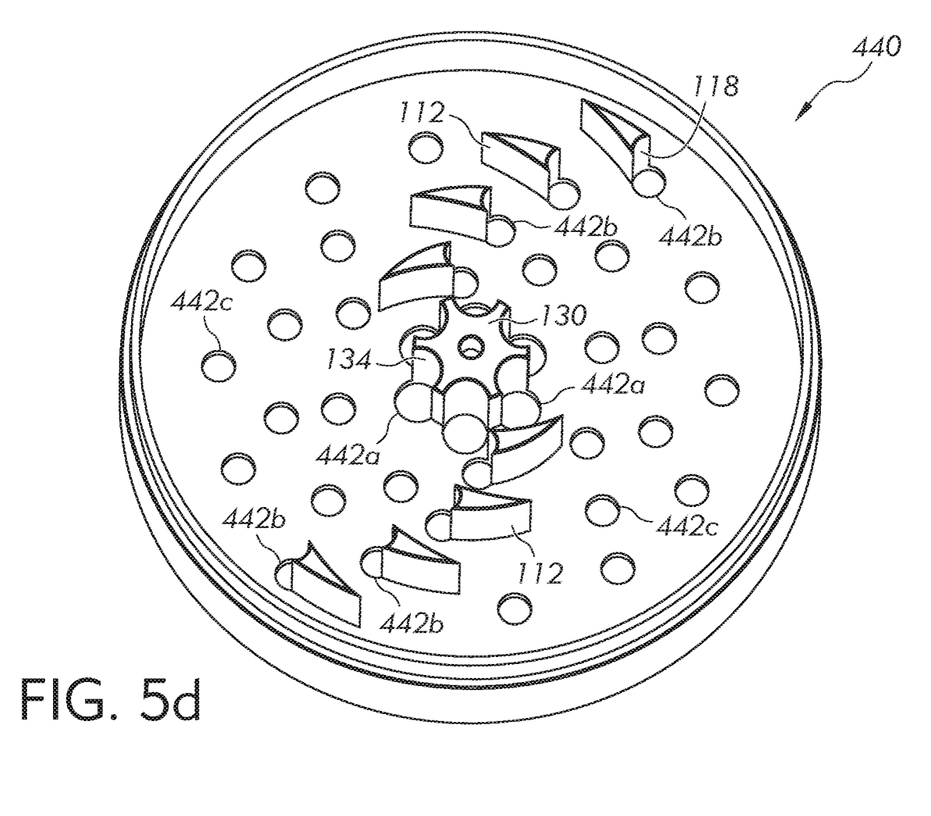

FIG. 5c shows grinder top 420 from within grind chamber 430. Grinder 400 is a four-inch wide embodiment and includes five blades 152 per row. FIG. 5d shows grinder bottom 440 from the side within grind chamber 330. As with grinder 300, bottom 440 includes four blades 112 per row. An opening 442a is formed within each circular cutout 134 of spindle 130, and follows the same circle as the cutouts. An opening 442b is formed for each blade 112, and follows the same circle as rear surface 118. Openings 442c are randomly distributed around grinder bottom 440. In other embodiments, any suitable distribution of openings 442 is used.

Figure 5E:
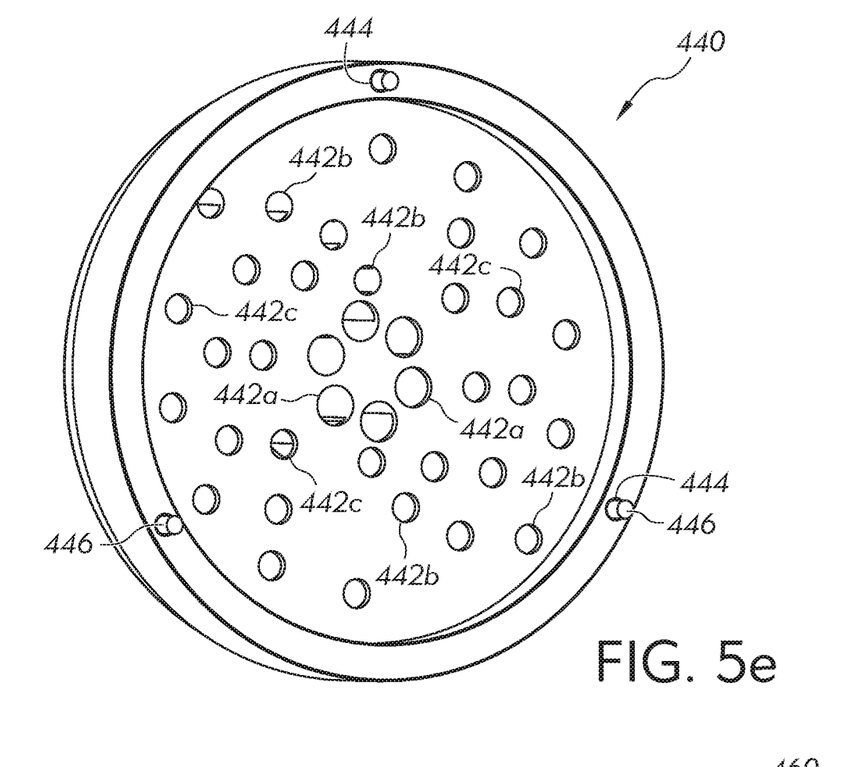
Figure 5F:
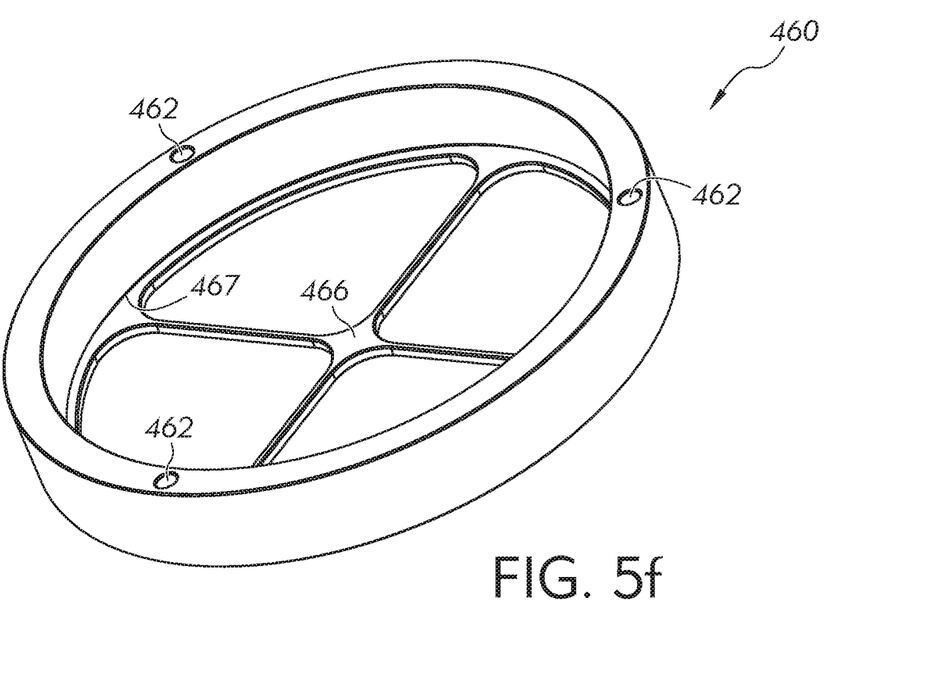

FIG. 5e shows grinder bottom 440 from within grind catching chamber 450. The distribution of openings 442 and cavities 444 is evident. Metal pins 446 extend outward from cavities 444. Metal pins 446 can be held in cavities 444 by being press-fit, with adhesive, or using any other suitable means. During use, pins 446 are inserted into the top portion of openings 462 to keep the parts turning together. A magnet is located in the bottom portion of opening 462, which is delineated by a line and a slightly different width in FIG. 5b. FIG. 5f shows filter holder 460 with a distribution of cavities 462 corresponding to cavities 444. Filter support 466 is illustrated as a cross, but other suitable shapes are used in other embodiments. Filter 468 is not included to better illustrated support 466.

Figure 5G:
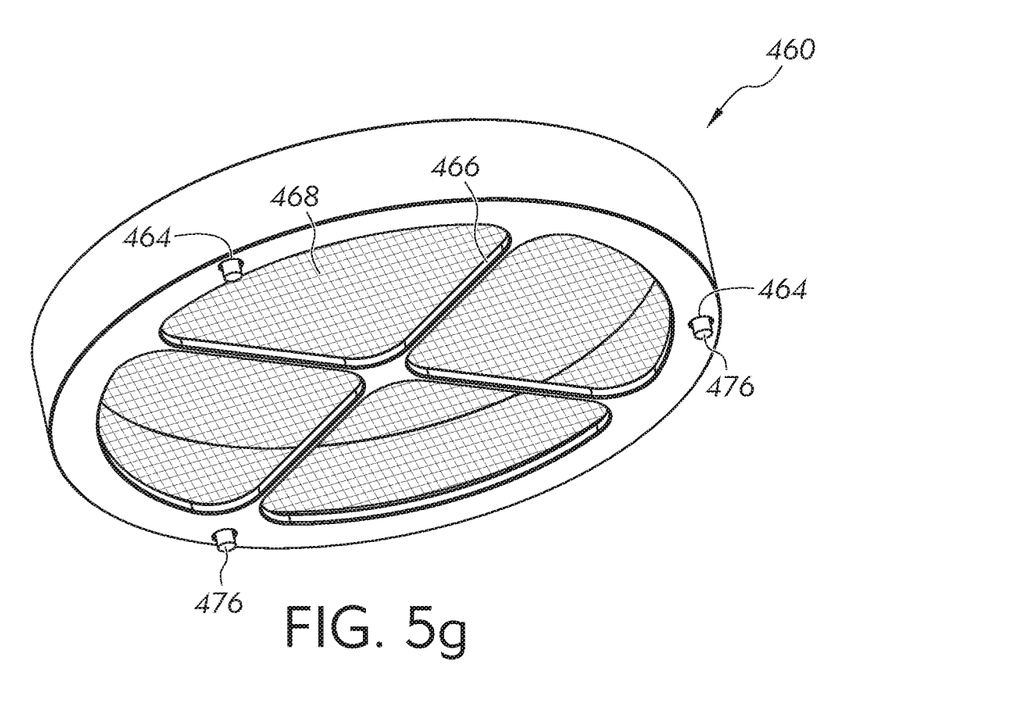
Figure 5H:
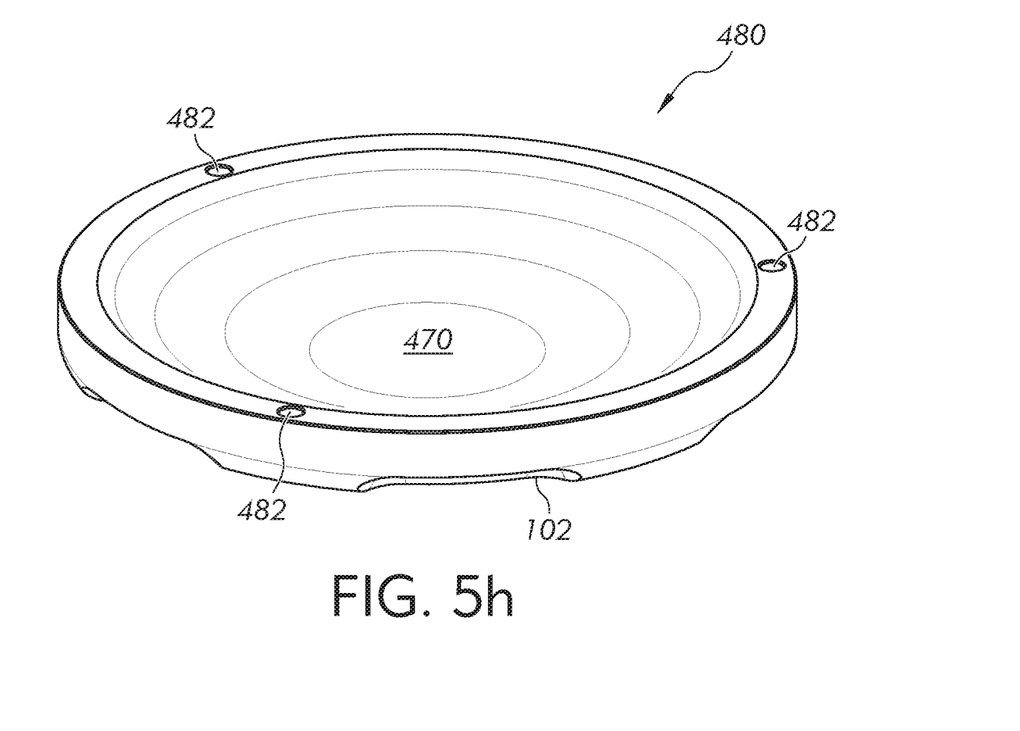

FIG. 5g shows the bottom of filter holder 460 with filter 468 installed. Pins 476 operate similarly to pins 446 and are inserted into cavities 482 of chamber bottom 480 during use. In some embodiments, filter 468 is interchangeable to configure the size of fine particles being filtered. Cavities 464 are seen in the bottom of filter holder 460. The same number of cavities 464 and 462 will normally be used, with each cavity 464 being formed half-way between two cavities 462. Interleaving the cavities creates a lateral separation so that the magnetism of each side does not significantly interfere with the other. FIG. 5h shows chamber bottom 480 with cavities 482. Cavities 482 correspond to cavities 464 to allow pins 476 to be inserted.

Chamber bottom 480 includes finger grips 102 for a user to apply force when turning grinder 400. The rotational force is transferred up from chamber bottom 480 to filter holder 460 and finally to grinder bottom 440 via pins 446 and 476.

In some embodiments, even more chambers are stacked to provide additional filtering by particle size, i.e., into more than two different chambers. In one embodiment, openings 442 are configured to dump the shredded material out to a larger container or onto a large net, rather than into a small chamber attached to the grinder. A hopper could be installed to feed material into the top, while shredded material drains out the openings in the bottom, to allow for continuous grinding. The process could be fully automated with a motor used to turn the grinder.

While one or more embodiments of the present invention have been illustrated in detail, the skilled artisan will appreciate that modifications and adaptations to those embodiments may be made without departing from the scope of the present invention as set forth in the following claims.

What is claimed:

1. A grinder, comprising:
   a bottom;
   a first row of first blades extending from the bottom;
   a top; and
   a second row of second blades extending from the top,
      wherein each of the first blades and second blades is
      shaped with, an outer surface curved along a first circle concentric with the grinder, an inner surface curved along a second circle nonconcentric with the grinder and meeting the outer surface to form a first point at a first end of the respective first or second blade, and a back surface extending between the inner surface and outer surface to form a pair of second points at a second end of the respective first or second blade;

wherein the first blades and second blades are triangle shaped;

wherein the first blades and second blades are configured to move past each other with the pairs of second points leading when the top is rotated in a first direction relative to the bottom; and wherein the first blades and second blades are configured to move past each other with the first points leading when the top is rotated in a second direction relative to the bottom opposite the first direction.

2. The grinder of claim 1, wherein:

each of the first blades includes an outer surface formed on a third circle that is concentric with the bottom;

each of the second blades includes an outer surface formed on a fourth circle that is concentric with the top; and each of the fourth circles is disposed between two of the third circles.

3. The grinder of claim 1, wherein each of the first blades and second blades is formed from three arcs connected in a triangular shape in plan view, wherein the inner surfaces are the same length as the respective outer surfaces, and wherein the back surfaces are shorter than the respective inner surfaces and outer surfaces.

4. The grinder of claim 1, wherein the bottom includes an opening formed through the bottom.

5. The grinder of claim 4, further including a filter disposed under the bottom.

6. A grinder, comprising:

a bottom;

a first triangular blade connected to the bottom, wherein the first triangular blade includes, an outer surface curved along a first circle concentric with the grinder, an inner surface curved along a second circle nonconcentric with the grinder and meeting the outer surface to form a first point oriented in a first direction around the bottom, and a back surface extending between the inner surface and outer surface to form a second point and third point oriented in a second direction around the bottom;

a top; and a second triangular blade connected to the top, wherein the second triangular blade includes, an outer surface curved along a third circle concentric with the grinder, an inner surface curved along a fourth circle nonconcentric with the grinder and meeting the outer surface to form a first point oriented in a first direction around the top, and a back surface extending between the inner surface and outer surface to form a second point and third point oriented in a second direction around the top;

wherein the first triangular blade and second triangular blade are configured to move past each other with their respective second and third points leading when the top is rotated in a first direction relative to the bottom; and wherein the first triangular blade and second triangular blade are configured to move past each other with their respective first points leading when the top is rotated in a second direction relative to the bottom opposite the first direction.

7. The grinder of claim 6, further including:

a first magnetic element disposed on the bottom; and a second magnetic element disposed on the top.

8. The grinder of claim 6, further including an opening formed through the bottom.

9. The grinder of claim 8, further including a filter holder attached to the bottom.

10. The grinder of claim 9, further including a pin extending into the bottom and into the filter holder.

11. The grinder of claim 6, further including a row of first triangular blades connected to the bottom.

12. The grinder of claim 11, wherein each first triangular blade of the row of first triangular blades is circumferentially offset from an adjacent first triangular blade.

13. The grinder of claim 6, wherein the bottom includes a spindle at a center of the bottom.

14. A grinder, comprising:

a bottom;

a top; and a triangular blade including, a first arc-shaped surface curved along a first circle concentric with the grinder, a second arc-shaped surface curved along a second circle nonconcentric with the grinder and connected to the first arc-shaped surface at a first end of the blade to form a first point of the blade, and a third arc-shaped surface connected to the first arc-shaped surface and second arc-shaped surface at a second end of the blade to form a second point and third point of the blade;

wherein the blade is configured to move with the first point leading when the bottom is rotated in a first direction relative to the top; and wherein the blade is configured to move with the second point and third point leading when the bottom is rotated in a second direction relative to the top.

15. The grinder of claim 14, wherein the first arc-shaped surface is convex, the second arc-shaped surface is concave, and the third arc-shaped surface is concave.

16. The grinder of claim 14, wherein a top of the grinder blade includes a chamfered edge.

17. The grinder of claim 14, wherein a length of the first arc-shaped surface is equal to a length of the second arc-shaped surface.

18. The grinder of claim 14, wherein the first arc-shaped surface and second arc-shaped surface are neither parallel nor concentric.

* * * * *